US012551083B2

(12) United States Patent
Honein et al.

(10) Patent No.: US 12,551,083 B2
(45) Date of Patent: Feb. 17, 2026

(54) ACOUSTIC TRANSDUCER SYSTEM

(71) Applicants: Tanios Victor Honein, Minden, NV (US); Bechara Victor Honein, Minden, NV (US); Elie Victor Honein, Minden, NV (US)

(72) Inventors: Tanios Victor Honein, Minden, NV (US); Bechara Victor Honein, Minden, NV (US); Elie Victor Honein, Minden, NV (US)

(*) Notice: Subject to any disclaimer, the term of this patent is extended or adjusted under 35 U.S.C. 154(b) by 467 days.

(21) Appl. No.: 18/569,199

(22) PCT Filed: Dec. 29, 2020

(86) PCT No.: PCT/US2020/067307
§ 371 (c)(1),
(2) Date: Dec. 11, 2023

(87) PCT Pub. No.: WO2021/138318
PCT Pub. Date: Jul. 8, 2021

(65) Prior Publication Data

US 2024/0197141 A1 Jun. 20, 2024

Related U.S. Application Data

(60) Provisional application No. 62/954,842, filed on Dec. 30, 2019.

(51) Int. Cl.

| | |
|---|---|
| ***A47L 15/22*** | (2006.01) |
| ***B06B 1/06*** | (2006.01) |
| ***D06F 19/00*** | (2006.01) |

(52) U.S. Cl.
CPC ............ *A47L 15/22* (2013.01); *B06B 1/0622* (2013.01); *B06B 1/0651* (2013.01); *D06F 19/00* (2013.01);
(Continued)

(58) Field of Classification Search
None
See application file for complete search history.

(56) References Cited

U.S. PATENT DOCUMENTS 4,727,734 A 3/1988 Kanazawa et al.
7,549,429 B2 6/2009 Nunomura et al.
(Continued)

FOREIGN PATENT DOCUMENTS

CN 206613797 11/2017
CN 109023826 12/2018
(Continued)

OTHER PUBLICATIONS

Chinese Patent Application No. 202080091175.1. "Second Office Action" dated Aug. 27, 2024. Machine Translation and Original.
(Continued)

*Primary Examiner* — Rita P Adhlakha
(74) *Attorney, Agent, or Firm* — Jeffrey G. Sheldon

(57) ABSTRACT

A system comprises a support, typically part of dishwashing machine or clothes washing machine, having a plurality of piezoelectric transducers. Each transducer can have a cylindrical housing with a water inlet along a side surface of the housing. The transducers can also comprise a lens and a piezoelectric material with electrodes configured to couple to a power supply.

19 Claims, 15 Drawing Sheets

(52) U.S. Cl.
CPC ....... *A47L 2601/17* (2013.01); *B06B 2201/71* (2013.01)

(56) References Cited

U.S. PATENT DOCUMENTS

| | | | | |
|---|---|---|---|---|
| 7,754,026 | B2 * | 7/2010 | Kehl .................. A47L 15/0002 134/191 | |
| 2002/0134117 | A1 | 9/2002 | Arai et al. | |
| 2005/0252255 | A1 | 11/2005 | Gray et al. | |
| 2006/0130243 | A1 | 6/2006 | Ozaltin et al. | |
| 2006/0191562 | A1 | 8/2006 | Nunomura et al. | |
| 2009/0120474 | A1 | 5/2009 | Kehl | |
| 2012/0227761 | A1 | 9/2012 | Leighton et al. | |
| 2018/0030698 | A1 | 2/2018 | Velapure et al. | |
| 2018/0147610 | A1 | 5/2018 | Birkin et al. | |

FOREIGN PATENT DOCUMENTS

| | | |
|---|---|---|
| CN | 109112765 | 1/2019 |
| CN | 109537244 | 3/2019 |
| FR | 2846865 | 5/2004 |
| JP | 60-242881 | 12/1985 |
| JP | 02-218325 | 8/1990 |
| JP | 2574450 | 1/1997 |
| JP | 10-179489 | 7/1998 |
| JP | 2004275721 | 10/2004 |
| KR | 20-1999-0040353 | 11/1999 |
| KR | 10-2005-0102116 | 10/2005 |

OTHER PUBLICATIONS

He Shengjing. “Physics Experiment Dictionary”. Popular Science Publishing House, Jan. 1991, p. 89. Machine Translation and Original.

Bao Ailian. “Welding Inspection”. Harbin Institute of Technology Press, pp. 97-98. Machine Translation and Original.

Korean Patent Application No. 10-2022-7023505. Preliminary Rejection dated Sep. 18, 2025. Original and English machine translation.

Chinese Patent Application No. 202080091175.1. “First Office Action” dated Jan. 24, 2024. Machine Translation and Original.

Chinese Patent Application No. 202080091175.1. “Decision of Rejection” dated Feb. 26, 2025. Original and English Translation. (translation provided by associate so the undersigned cannot confirm the accuracy).

PCT/US2020/067307. International Search Report and Written Opinion dated Mar. 25, 2021. 16 pages.

European Patent Application No. 20 910 559.2. Extended European Search Report dated Nov. 17, 2023. 12 pages.

Japanese Patent Application No. 2022-537148. Office Action dated Nov. 30, 2023. 11 pages.

* cited by examiner

ACOUSTIC TRANSDUCER SYSTEM

CROSS-REFERENCE TO RELATED APPLICATIONS

This PCT application claims the benefit of U.S. Provisional Patent Application Ser. No. 62/954,842, titled "Acoustic Transducer System," filed Dec. 30, 2019, the contents of which are incorporated by reference in their entirety.

BACKGROUND

Current dishwashing machines operate by spraying hot water on the dishes and tableware contained therein. During the washing cycle the water is mixed with a dishwasher detergent and pumped to one or more rotating spray arms, which then blast the dishes with the cleaning mixture. During the rinse cycle the process is repeated using pure water which may be mixed with rinse-aid to prevent droplets formation, thus reducing water spots from hard waters. However, there are deficiencies with current dishwashing machines.

Current clothes washing machines also operate in a similar way, using a combination of mechanical tumbling motions and agitated pumped water to clean clothes. There are deficiencies with current clothes washing machines.

The present invention is directed to a system, which is particularly useful for dishwashing and clothes washing.

SUMMARY

The present invention overcomes deficiencies of the prior art. In particular, a system according to the present invention comprises at least one support and a plurality of piezoelectric transducers supported by the support. Each piezoelectric transducer can comprise a cylindrical housing having a cylindrical side surface, a closed bottom surface, and a conical or pyramidal top surface with a water outlet centered along the top surface of the housing; a water inlet along the side surface of the body; a lens; a piezoelectric material having an upper surface and a lower surface, the upper surface of the piezoelectric material coupled to the lens; and two electrodes electrically coupled to the upper surface and the lower surface of the piezoelectric material and configured to couple to a power supply.

The water inlet and water outlet are in fluid communication.

The support can be part of dishwashing machine or clothes washing machine. For example, the support fork can comprise two rotating arms rotatably coupled to an interior bottom surface of the machine, with a plurality of the piezoelectric transducers on each arm.

Optionally, the support can comprise at least one slideable arm slideably coupled to an interior surface of the machine.

The support can be helix shaped or spiral shaped.

When the machine is a clothes washing machine, it can comprise a non-rotatable drum with the support coupled to an interior surface of the drum. Optionally, the drum can be the support. The transducers can comprise a plurality of donut-shaped transducers coupled to an interior bottom surface of the drum, with the transducers spaced around the perimeter of the interior bottom surface of the drum.

Preferably the piezoelectric material is lead zirconate titanate.

DRAWINGS

These and other features, aspects and advantages of the present invention will become better understood with reference to the following description, appended claims, and accompanying drawings where:

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," do not exclude other components or steps.

The invention utilizes an improved acoustic transducer system. This system can be utilized in dishwashing machines and clothes washing machines, among other applications.

Referring now to FIGS. 1 through 4, there is shown a piezoelectric transducer 100 of the present invention.

Figure 1:
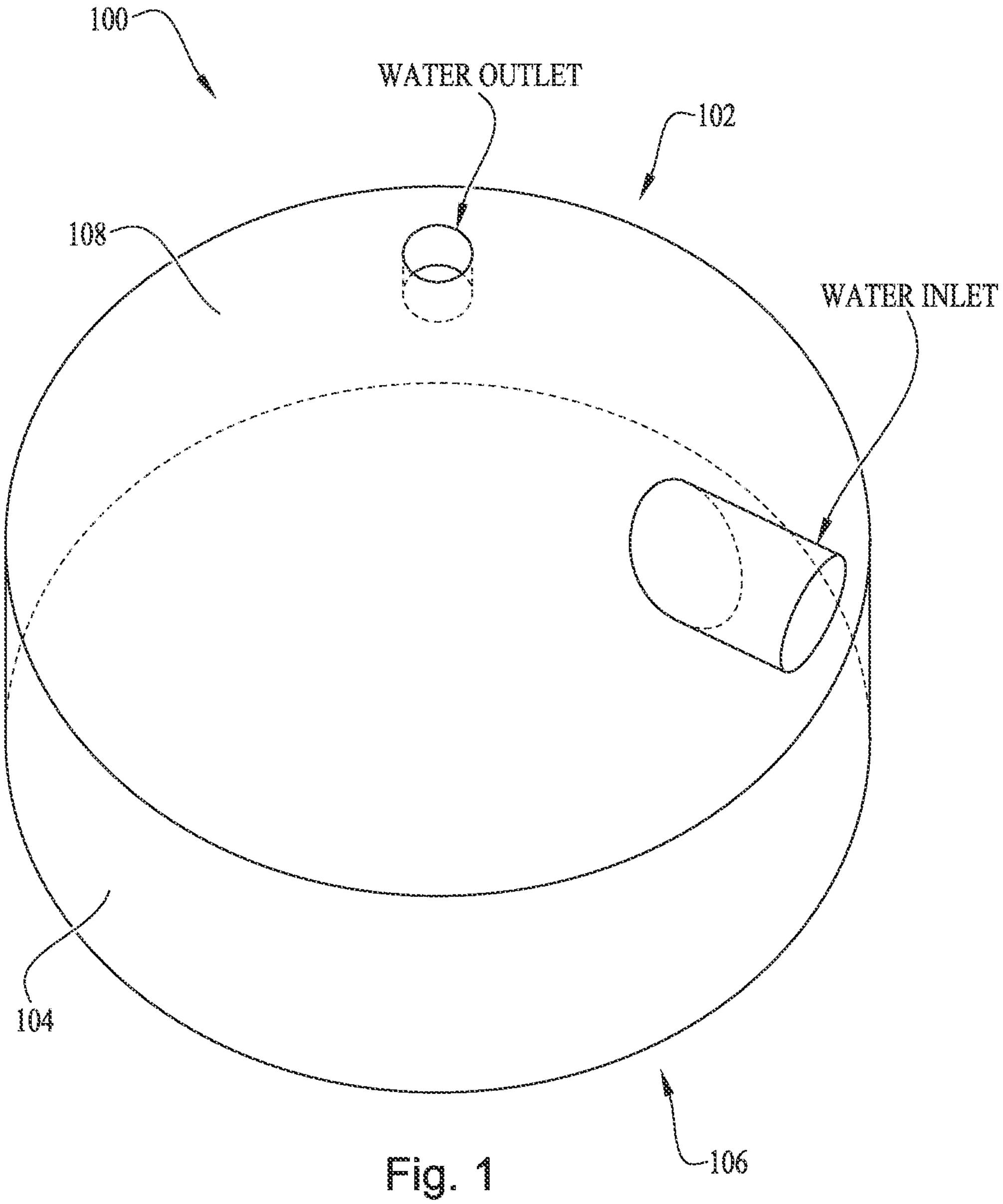
FIG. 1 is a top perspective view of a piezoelectric transducer, having features of the present invention wherein the transducer can have one or a plurality of water inlets.

FIG. 1 shows a body 102 of one version of the transducer 100. The body 102 is cylindrical with a cylindrical side surface 104, a closed bottom surface 106 and a conical or pyramidal top surface 108, the top surface 108 having at least one inwardly slanted surface 110. The body 102 has a water inlet along a side surface 108 of the body 102 and a water outlet centered at the top surface 108 of the body 102. The water inlet and the water outlet are in fluid communication for flowing water from the inlet to the outlet. Along an interior surface of the bottom surface 106 of the body 102 is a layer of piezoelectric material 112. On top of the piezoelectric material 112 (distal the bottom surface of the body 102) is a lens 114.

The piezoelectric material 112 has an upper surface 116 and a lower surface 118. The lower surface 118 of the piezoelectric material 112 is proximate the bottom surface 106 of the body 102 and the upper surface 118 of the piezoelectric material 112 is distal the bottom surface 106 of the body 102. As noted above, the lens 114 is coupled to the upper surface 116 of the piezoelectric material 112. The lens 114 can be ionized aluminum, stainless steel or glass, among others. Ionized aluminum is chemically and mechanically stable and relatively inexpensive.

Two electrodes 120 can be coupled to the lower surface 118 and to the upper surface 116 of the piezoelectric material 112. The electrodes 120 are spaced along the lower surface 118 and the upper surface 116 of the piezoelectric material 112 and are electrically connected to a power supply 122. The electrodes 120 can be vacuum-deposited thin layers (3500 Å) of chrome or chrome/gold. These electrodes 120 can be connected to the power supply 122 through soldered wire leads. The piezoelectric material 112 does not have to be coupled directly to the body 102 of the transducer 100 and a space filled with air may be between the lower surface 118 of the piezoelectric material 112 and the bottom surface 106 of the body 102.

Figure 2:
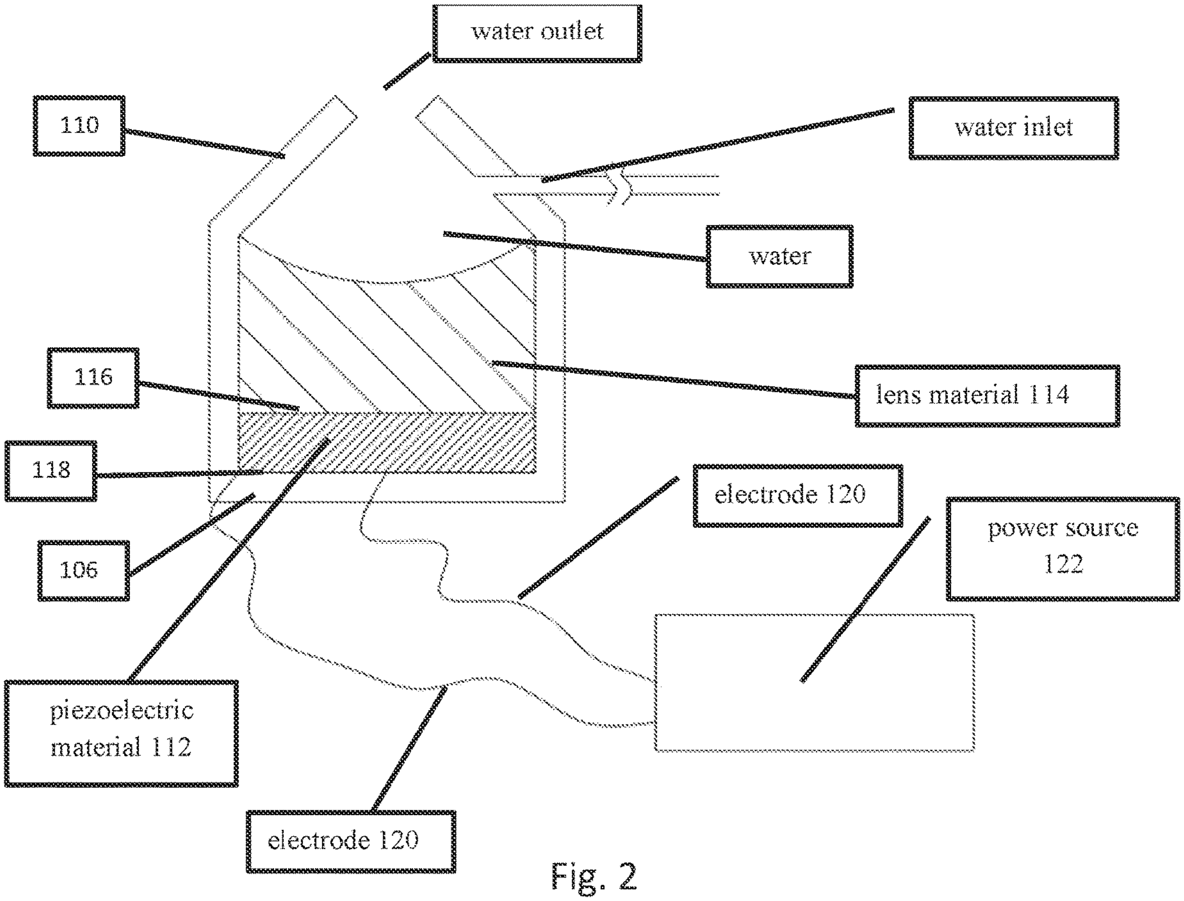
FIG. 2 is a cross-sectional view of a transducer system utilizing the transducer of FIG. 1.

FIG. 2 is a cross-sectional view of the transducer 100 of FIG. 1 with the water inlet located along one of the slanted sides 110 of the top surface 108 of the body 102.

Figure 19:
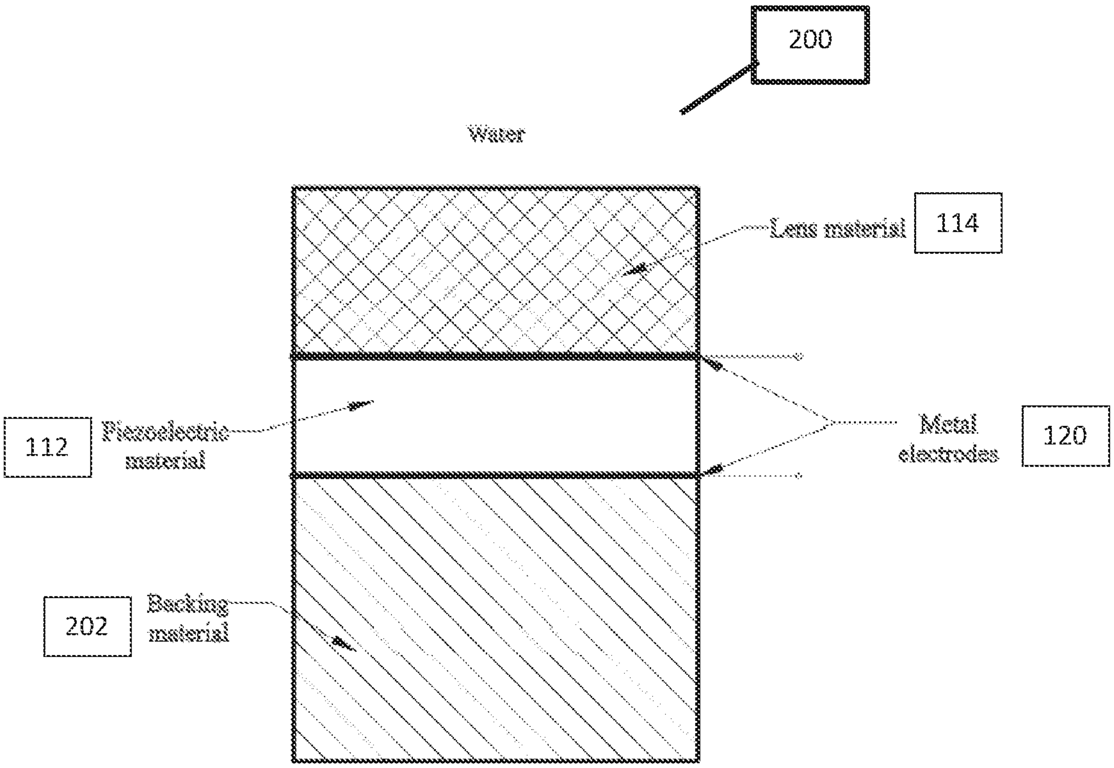
FIG. 19 is a sectional, side plan view of a transducer with backing material coupled with a piezoelectric material sandwiched between two electrodes and coupled to a lens material with a flat surface.

FIG. 19 is a sectional side plan view of a transducer 200 with an optional backing material 202 shown. The backing material 202 could be air, brass, synthetic rubber, or an acoustically lossy material. The piezoelectric material 112 is sandwiched between the two electrodes 120 and a lens 114 having a flat surface.

Figure 16:
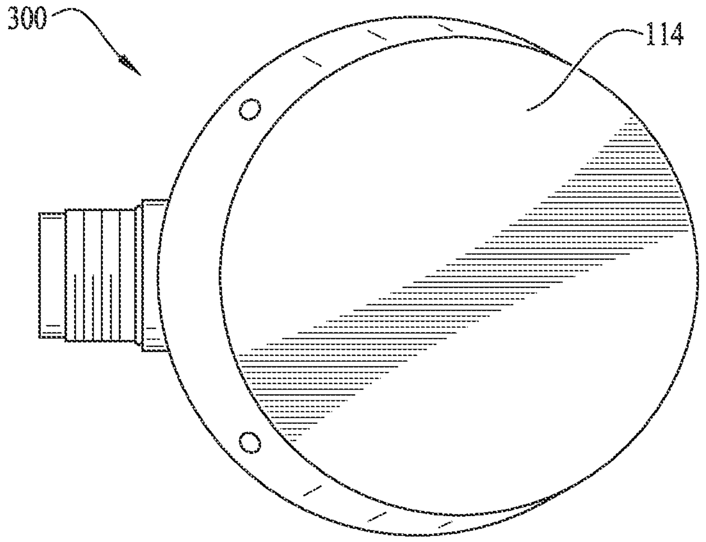
FIG. 16 is a top perspective view of a spherically-focused lens.

FIG. 16 shows a transducer 300 having a curved lens 114. The curvature can be spherical, cylindrical, or optionally no curvature can be used. The different types of lens 114 curvatures result in different shaped acoustic streams. For example, the spherical curved lens 114 of the transducer 300 focuses the energy (acoustic stream) almost at a point, while a cylindrically curved lens 114 focuses the acoustic stream in a line or slot shape. The line or slot shape can be extremely narrow or wide, thus making the acoustic spray pattern thin or thick. The shape of the water outlet also helps to focus the acoustic stream.

Figure 20:
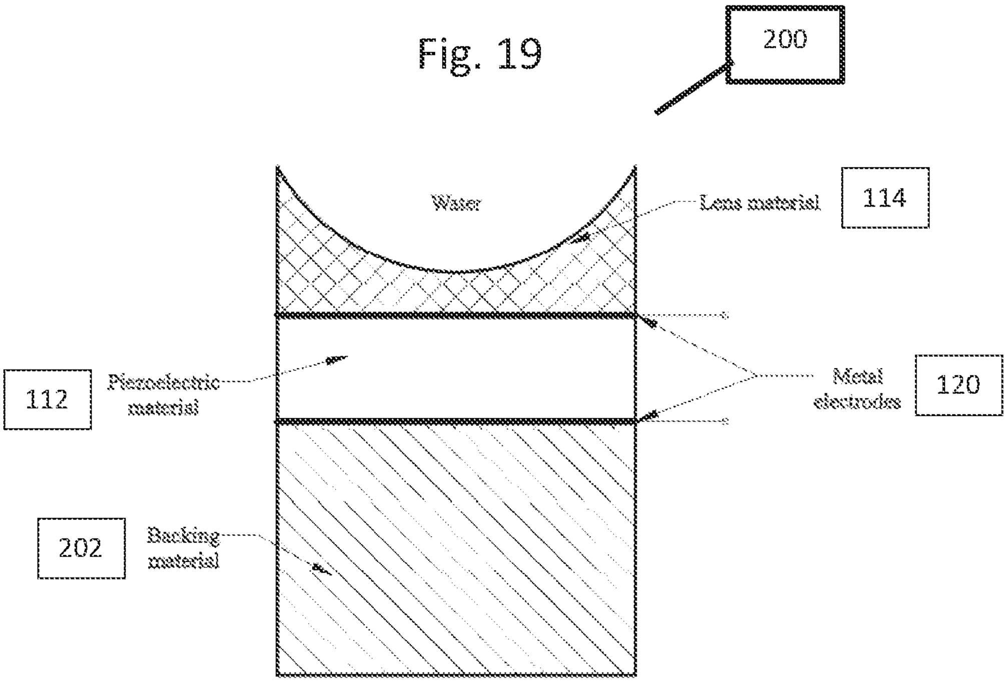
FIG. 20 is sectional side plan view of the transducer of FIG. 19, wherein the surface of the lens material is curved.

FIG. 20 is a sectional side plan view of the transducer 200 of FIG. 19, but the surface of the lens material 114 is curved.

Figure 21:
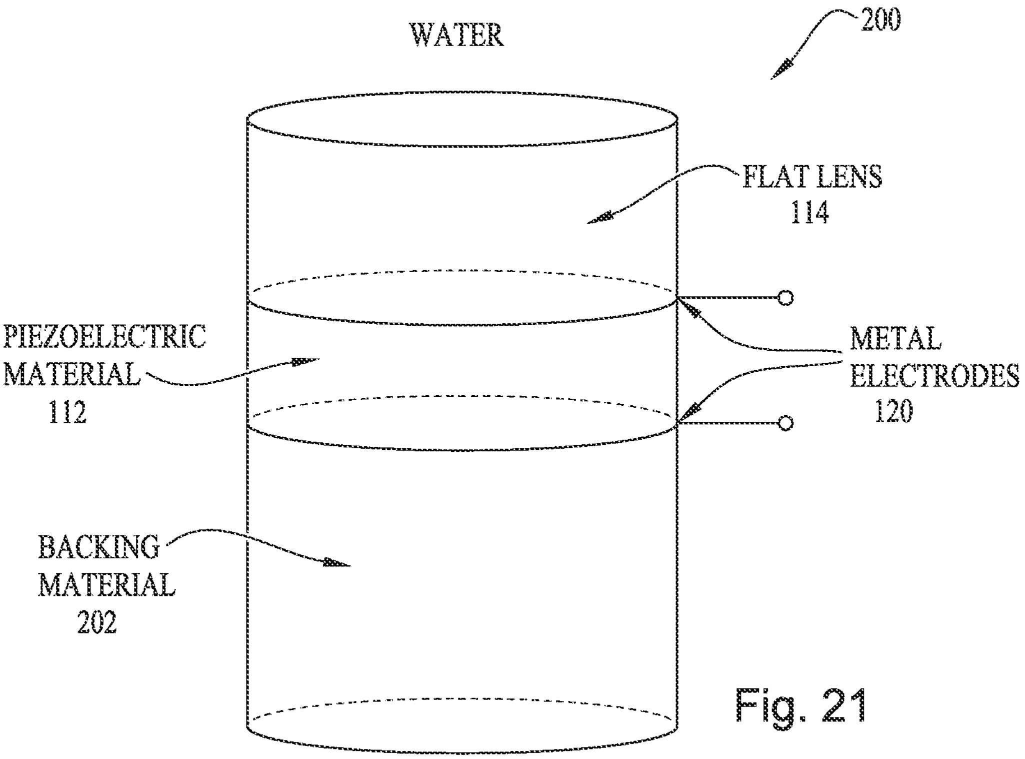
FIG. 21 is a perspective view of the transducer of FIG. 19.

FIG. 21 is a perspective view of the transducer 200 of FIG. 19.

Figure 22:
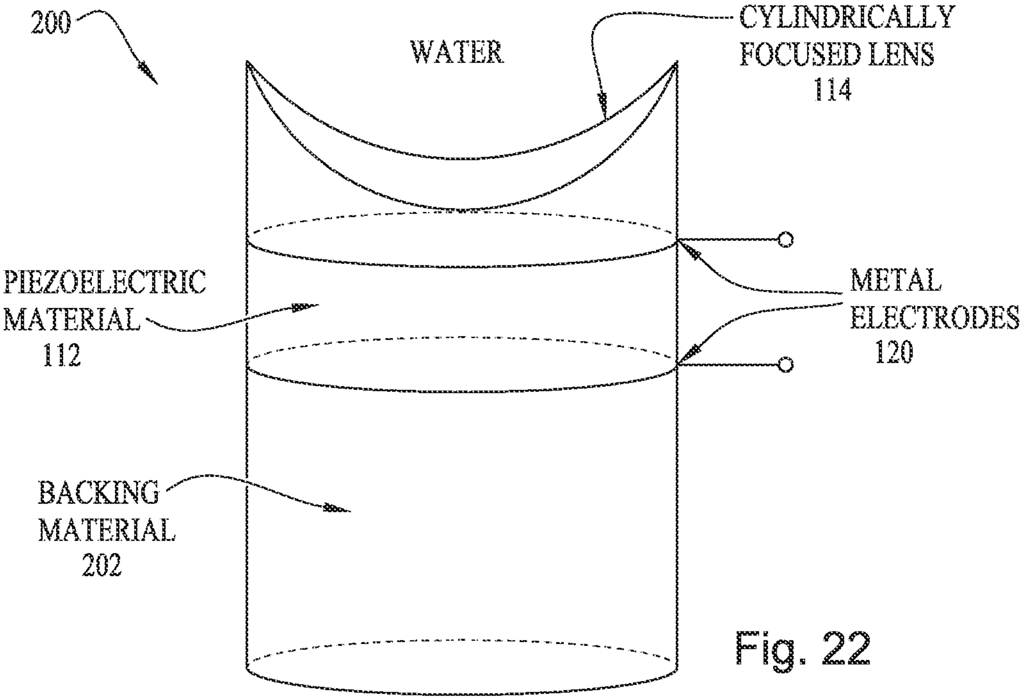
FIG. 22 is a perspective view of the transducer of FIG. 20 where the curved surface is cylindrical.

FIG. 22 is a perspective view of the transducer 200 of FIG. 20 where the curved surface of the lens 114 is cylindrical.

Figure 23:
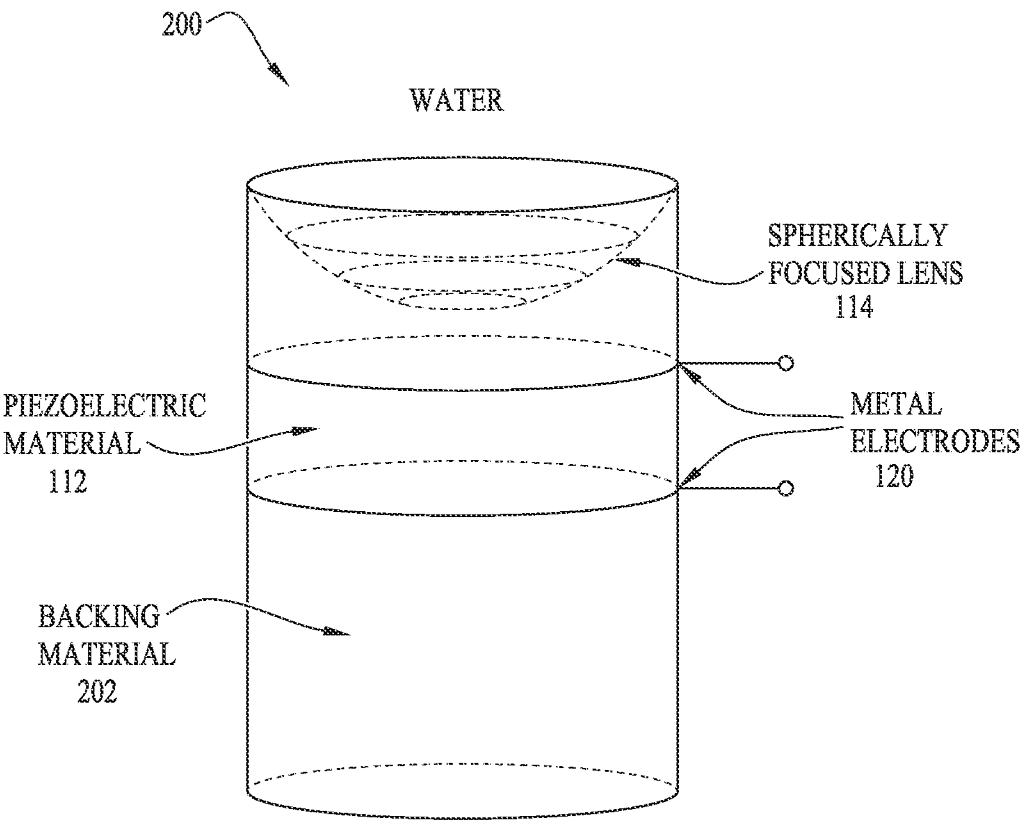
FIG. 23 is a perspective view of the transducer of FIG. 20, where the curved surface is spherical.

FIG. 23 is a perspective view of the transducer 200 of FIG. 20, where the curved surface of the lens 114 is spherical.

When an electric field is applied to a piezoelectric material, it changes its mechanical dimensions. This phenomenon is called the converse piezoelectric effect which is linear. Piezoelectric transducers are a type of electroacoustic transducers that converts an oscillatory electrical signal into vibrations in the piezoelectric crystal which can serve as a source of waves propagating throughout the whole system. The active element is the heart of the transducer as it converts the electrical energy to acoustic energy. The active element is essentially a ferroelectric material such as PZT ceramics or lithium niobate which exhibit a dipole moment. Above a certain temperature, known as the Curie point, the dipole direction has random orientations. The dipoles may be aligned by applying a strong electric field at a temperature near the Curie point; this process is known as poling. When an electric field is applied across an already poled material, the aligned dipole moments tend to expand or contract in the same direction which causes the material to change dimensions. This phenomenon is similar but distinct from electrostriction. The distinction lies in the fact that the deformations due to electrostriction are proportional to the square of the applied electric field and therefore are independent of the direction of the field. Whereas piezoelectric deformations are directly proportional to the electric field and reverse direction with the sign of the field. Furthermore electrostriction is a universal property of dielectrics and its effect is always extremely minute. Also piezoelectricity is a reversible effect. For instance, a permanently-polarized material such as quartz (SiO2) or barium titanate (BaTiO3) produces an electric field when the material changes dimensions as a result of an imposed mechanical force. This phenomenon is known as the direct piezoelectric effect.

The active element of most acoustic transducers used today is a piezoelectric ceramic, which can be cut in various ways to produce different wave modes. The device has a resonant frequency which depends on the thickness of the active element and the lens and their piezoelectric properties. The preferred active element of the transducer of present invention is lead zirconate titanate, also known as PZT. PZT has many variants such as PZT4 and PZT5. Other piezoelectric materials such as zinc oxide may be used but PZT is currently preferred because it can operate efficiently from 100 kHz to 30 MHz. Other materials, such as metamaterials, which convert electric energy into acoustic energy, can also be used.

The frequency that the transducer operates at is determined by the material the lens is made out of, the piezoelectric material and the depth/height of the housing. Typically, the transducers operate at a high frequency (frequency range can be from few Hertz to beyond GigaHertz range) and generate high powered acoustic waves that can have an extremely shallow focus to an extremely narrow focus.

Preferably the transducer operates in the ultrasonic or megasonic range. The acoustic waves cause the water molecules to vibration.

Figure 3:
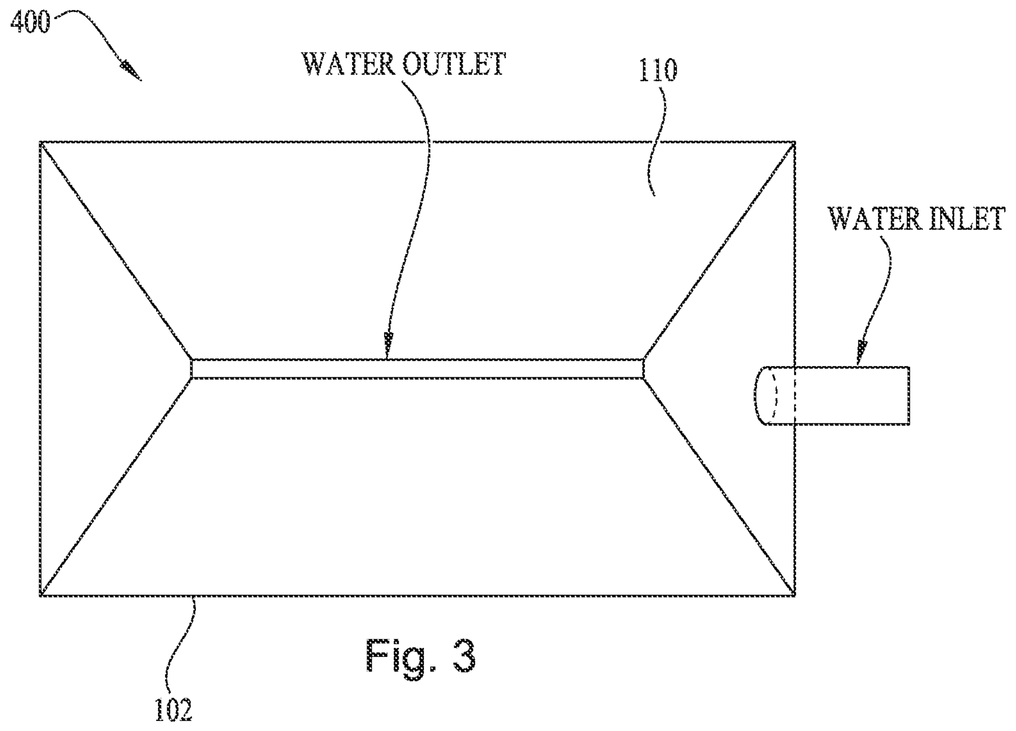
FIG. 3 is a top plan view of a piezoelectric transducer with a cylindrically-focused lens.
Figure 4:
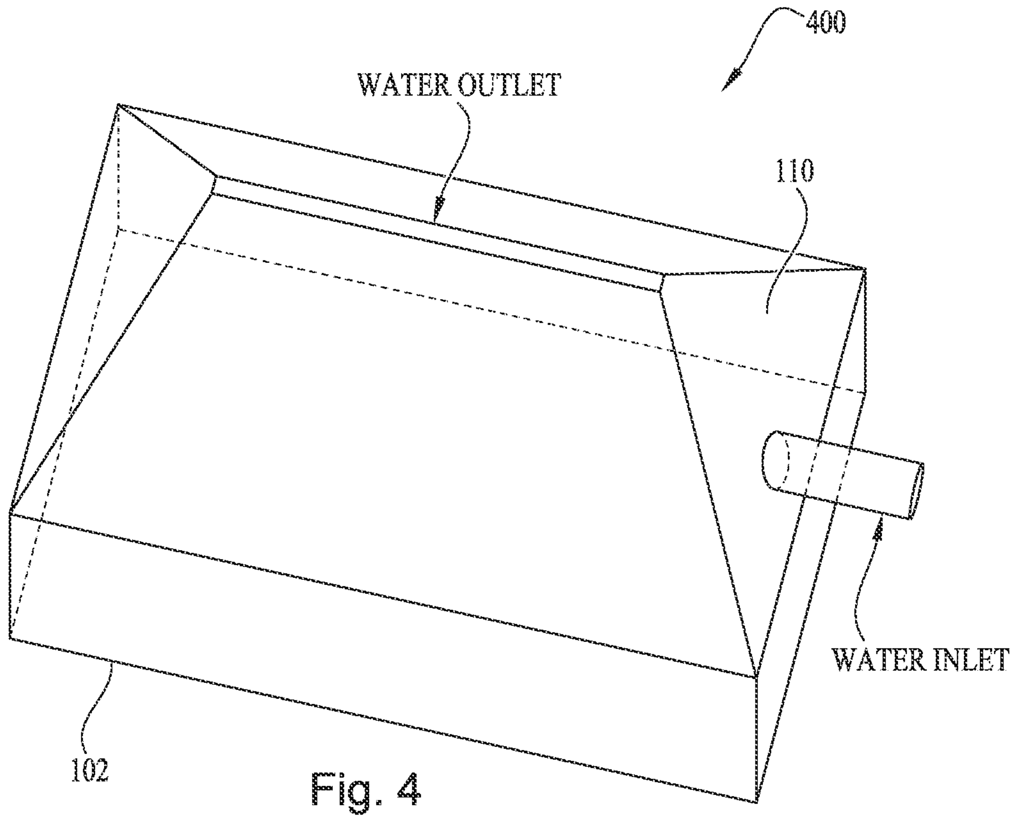
FIG. 4 is a perspective view of the transducer shown in FIG. 3.

FIGS. 3 and 4 show a transducer 400 having a rectangular shaped body 102.

In FIG. 3, the water outlet is a narrow rectangular strip along the top surface 108 of the body 102, rather than a circular hole as in the spherically shaped body 102 of the transducer 100 of FIGS. 1 and 2.

As noted above, the backing material 202 is optional and thus the transducer 100, 200, 300, 400 can have no backing material 202. Alternatively, the air in the transducer 100, 200, 300, 400 can be considered the backing material.

In use, water enters the housing 102 of the transducer 100, 200, 300, 400 via the water inlets. Once water is in contact with the curved surface of the lens 114, a sensor activates the transducer 100, 200, 300, 400 and makes it vibrate. The water exits the transducer 100, 200, 300, 400 housing 102 via the water outlet with an acoustic stream which can be sprayed over the dishes or the clothes.

Optionally, the transducer 100, 200, 300, 400 does not have a lens 114.

Figure 14:
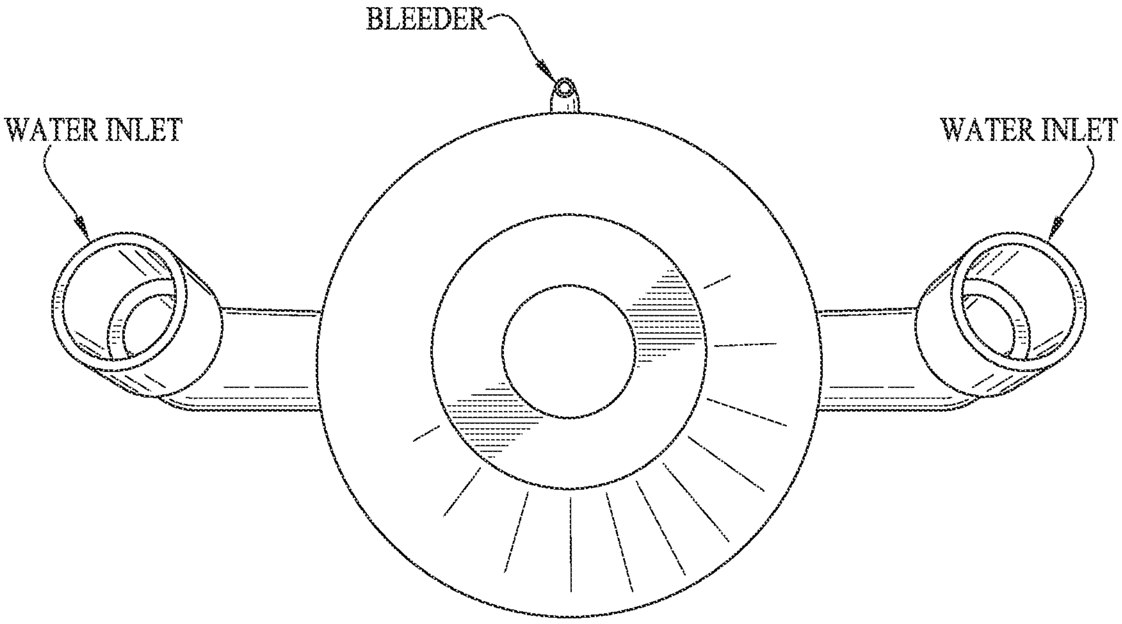
FIG. 14 is a top perspective view of a spherically-focused transducer with two water inlets and a bleeder to prevent air from being trapped.

As shown in FIG. 14, the transducer 100 can optionally comprise a bleeder to prevent air from being trapped.

The acoustic stream is introduced into a water jet (in a dishwashing machine for example) by installing a transducer 100, 200, 300, 400 inside each of the openings of a spray bar where the water flow is exiting the spray bar.

In one embodiment, the present invention is a system 500 comprising a support 502 (for example, a hollow rod or spray bar in a dishwashing machine 504) having a plurality of transducers 100, 200, 300, 400 installed therein. The support 502 can be made in different shapes and configurations from longitudinal to lateral, spiral to elliptical to helical, and circular to cylindrical. See FIGS. 7-13 for exemplary support 502 shapes/configurations.

The support 502 (spray bar) can be positioned in any direction in within the dishwasher 504 and optionally, the dishwasher 504 can comprise a plurality of supports 502 for achieving the necessary level of cleaning.

Figure 5:
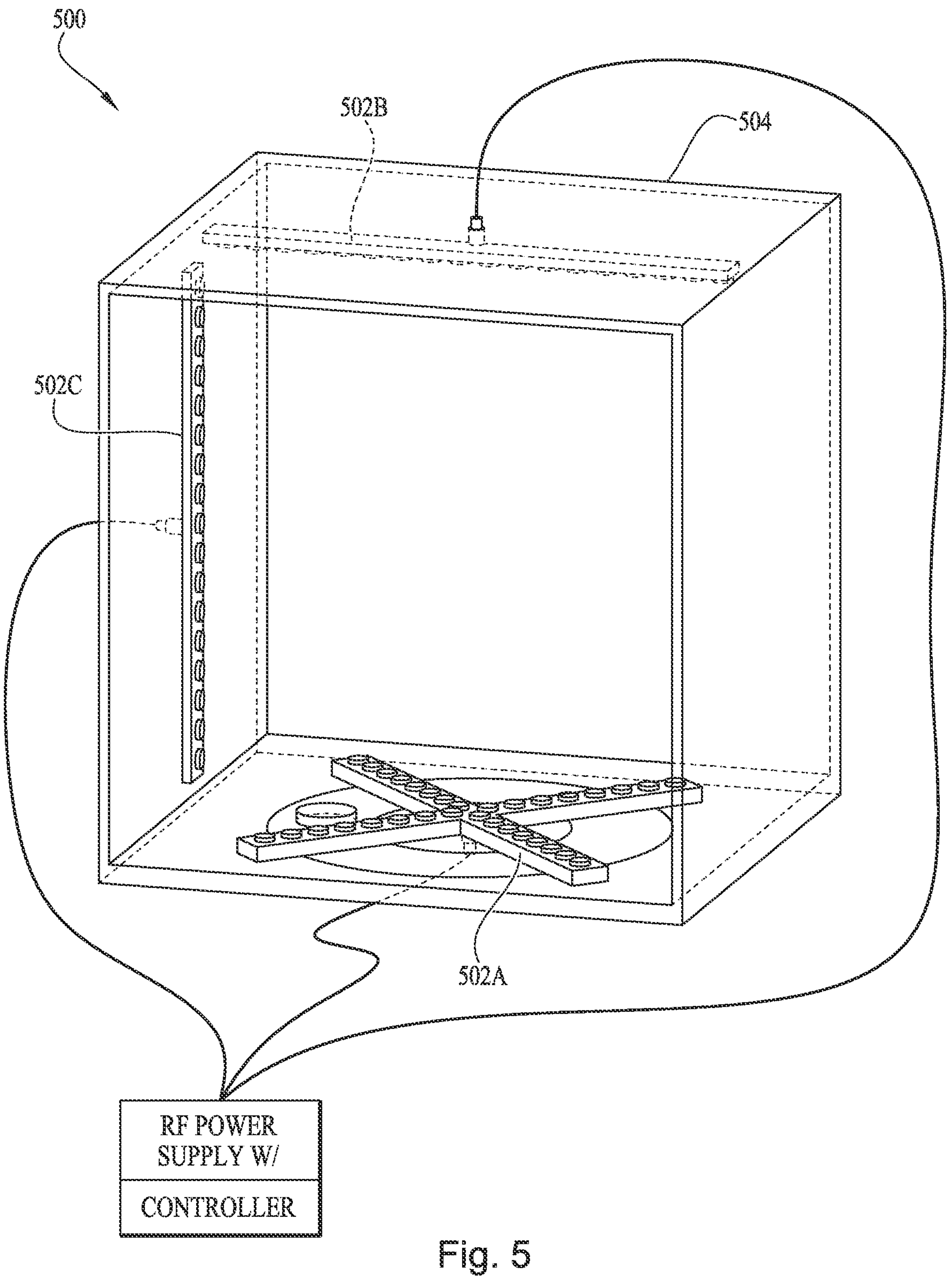
FIG. 5 is a perspective view of a dishwashing machine having a plurality of the piezoelectric transducers of FIG. 1 installed therein.

Referring now to FIG. 5, there is shown a dishwasher 504 having features of the present invention. At the bottom of the dishwasher 504 there are two rotating spray arms (supports) 502A, and the traditional water exit holes have been replaced with the piezoelectric transducers 100, 200, 300, 400. Optionally, there is a top spray bar (support) 502B mounted along the top of the dishwasher 504, and a side spray bar (support) 502C mounted along a side wall of the dishwasher 504. The transducers 100, 200, 300, 400 have been distributed along the lengths of the top and side spray bars (supports) 502. The side spray bar 502C can be slidably coupled to the side wall of the dishwasher 504 so that it can slide back and forth along the side wall while remaining vertical. The top spray bar 502B can also be slidably coupled to the top of the dishwasher 504 so that it can slide/move side to side while remaining horizontally oriented.

Optionally, the dishwasher 504 can have only one top spray bar 502B, only one side spray bar 502C or only one rotating spray arm 502A at the bottom of the dishwasher 504 with transducers 100, 200, 300, 400 installed therein.

A possible transducer configuration is sixteen transducers 100, 200, 300, 400 proximate to or at the bottom of the dishwasher 504 and an additional sixteen transducers 100, 200, 300, 400 distributed throughout the body of the dishwasher 504.

Typically the spacing between transducers 100, 200, 300, 400 can vary between 1 and 4 inches. A typical number of total transducers 100, 200, 300, 400 in the dishwasher 504 can vary between 20 and 40 transducers.

Each transducer 100, 200, 300, 400 has its own frequency. Optionally, all transducers 100, 200, 300, 400 can operate in unison or the transducers can be operated at different frequencies and at different times, thus covering a broader frequency band. The transducers 100, 200, 300, 400 can be operated continuously throughout the washing cycle or the transducers can be operated in bursts throughout the washing cycle.

The transducers 100, 200, 300, 400 discussed above can be utilized in both dishwashing machines 504, clothes washing machines, and optionally clothes drying machines (discussed in greater detail below), among other devices.

Figure 6:
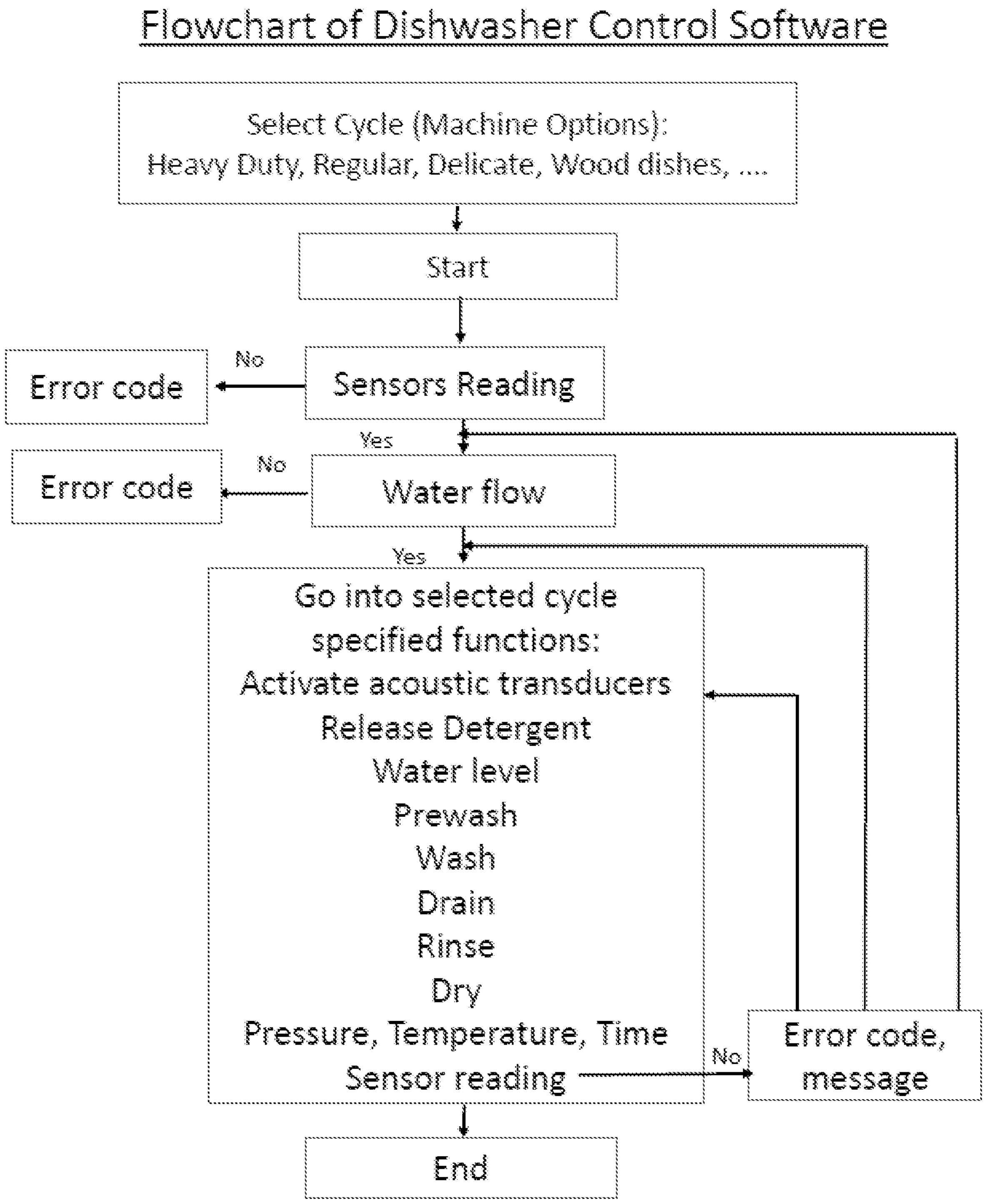
FIG. 6 is a flow chart of a software control for a dishwasher having features of the present invention.
Figure 7:
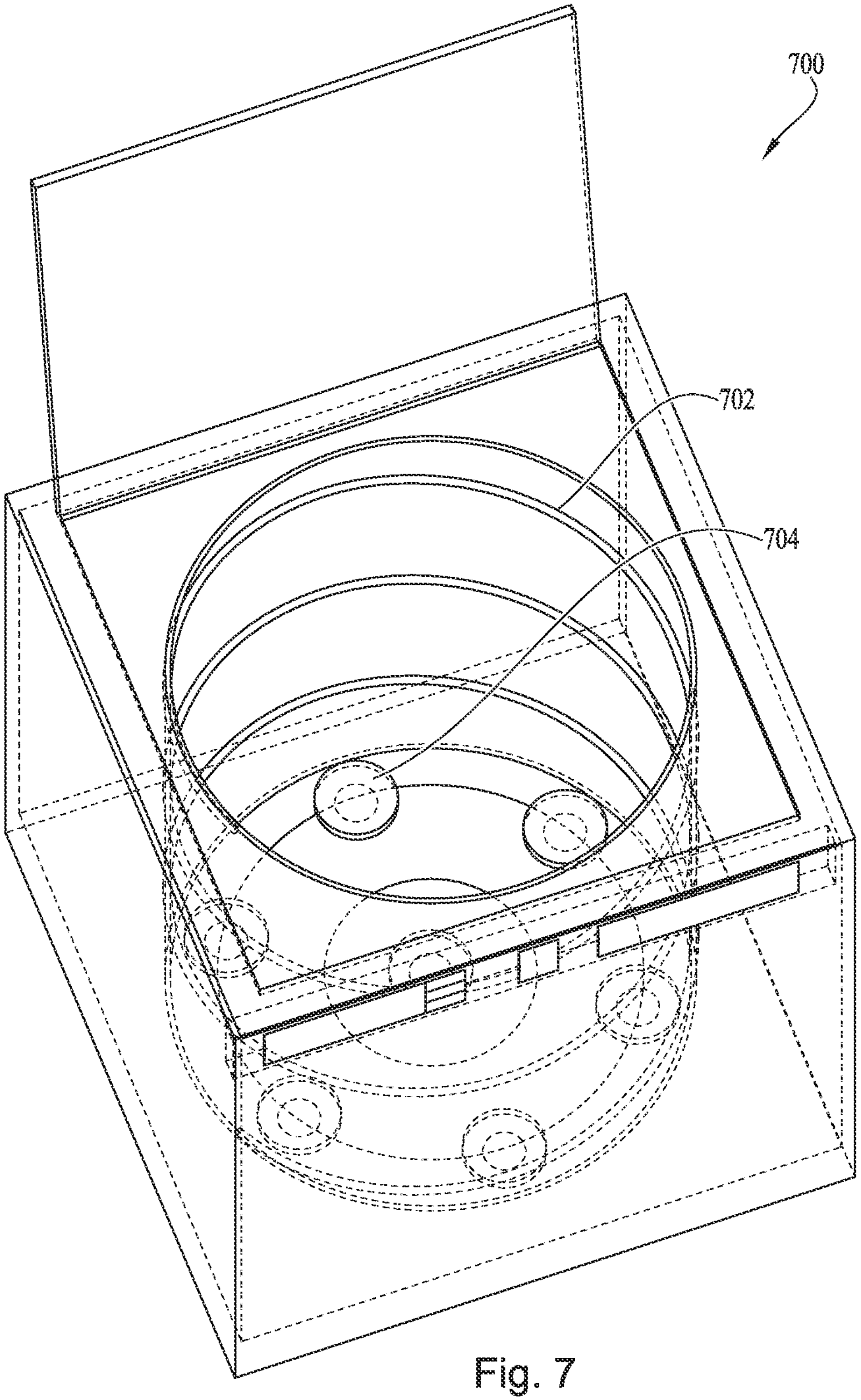
FIG. 7 is a top perspective view of a clothes washer having a plurality of the piezoelectric transducers of FIG. 1 installed therein.

Referring now to FIG. 6 there is shown a flow chart of a software control for a dishwasher 504 having features of the present invention.

As the water squirts from a spray bar (support) 502 inside a dishwasher 504, it is injected with acoustic energy using a plurality of piezoelectric transducers 100, 200, 300, 400 which causes the water molecules to vibrate at a given frequency. The impact of the acoustic water jet on a soiled dish gives rise to three new cleaning mechanisms in addition to the one due to the force of impact. First, due to the back and forth motion of the oscillation of the water molecules a cleaning action similar to the one caused by manual scrubbing is introduced. This action, however, occurs without any mechanical contact with a solid object such as a brush or a sponge. Second, the vibration of the water molecules induces body waves in the crockery which help dislodge food particles from the surface. Third, the action of the acoustic jet introduces surface waves which tend to separate the soiled dish from stickier items. The cleaning action is also due to cavitation and bubble formation which help dislodge food stuck to the dishes.

When the dishes are clean and the drying cycle begins, the plurality of transducers 100, 200, 300, 400 can be used to create mini acoustic air tornadoes inside the dishwasher 504 to speed up the drying process.

As noted above, the support structure of the present invention can also be structure in a clothes washing machine 700, and optionally, a clothes drying machine. The clothes washing machine 700 has at least one support 702 mounted therein, and the typical tumbling action of the clothes can be mimicked by moving the various supports 702, thus exposing the surfaces of the clothes to the acoustic streams from the support 702. The movement of the support 702 negates the need for a rotating drum, thus possibly reducing manufacturing costs of clothes washing machines 700. Additionally, the present invention saves both time and energy because the clothes are cleaned more efficiently than the random tumbling action they are typically exposed to. Additionally, because a rotating drum is not necessary, the drum does not have to be a cylindrical drum. It can be different shapes such as a conical shape that focuses the clothes washing energy more efficiently.

In a clothes washer 700 that is either comprised of a fixed cylindrical drum or a conical drum, the supports 702 can be configured in different shapes and forms to create mini acoustic tornadoes of water and detergents that cause the clothes to tumble during the wash process.

In the clothes drying process, the transducers 100, 200, 300, 400 of the present invention become air transducers (rather than water transducers). The transducers 100, 200, 300, 400 create an acoustic air stream (rather than an acoustic water stream). The drying occurs by carrying the air stream over the clothes even when they are not in mechanical contact with the transducer. Alternatively water and air transducers can be installed side by side.

The air temperature and pressure can be adjusted and optimized in order to minimize the overall energy consumption and to suit the kind of fabric.

Moreover, the washing or drying process can be enhanced by activating acoustic shakers such as the doughnut-shape transducers 704 attached to the body of the unit holding the articles. See FIG. 15 for a top perspective view of a doughnut-shaped transducer 704.

Figure 8:
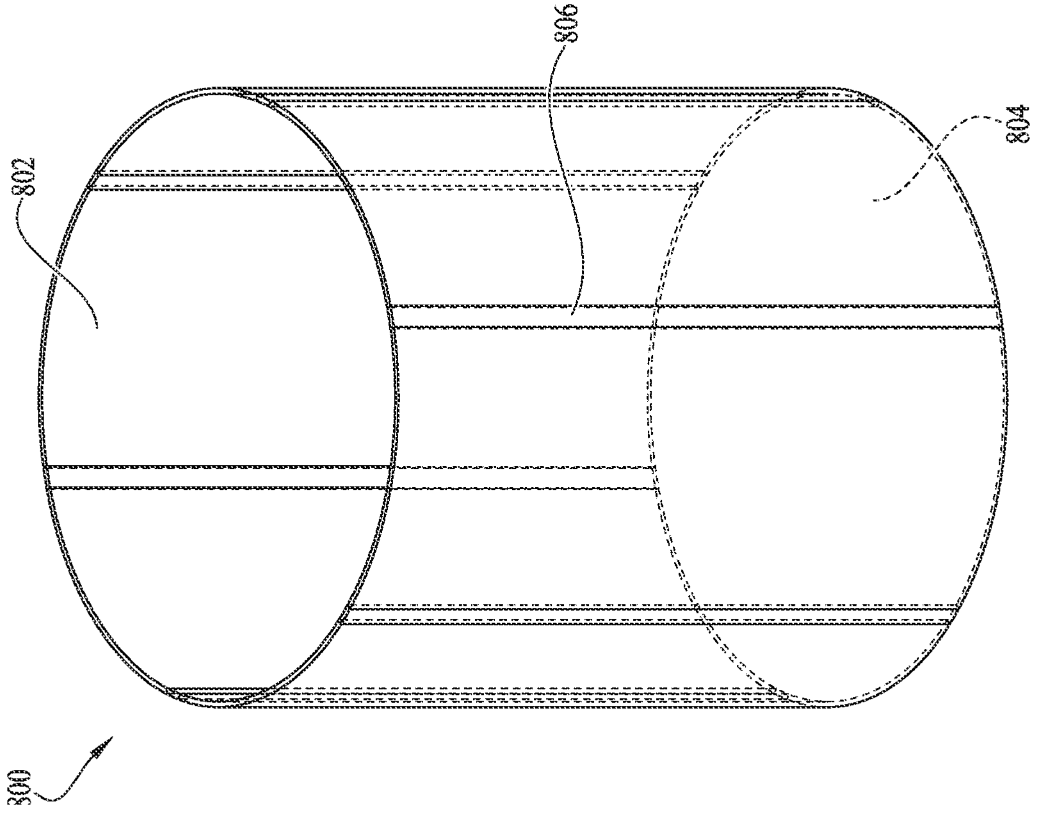
FIG. 8 is a perspective view of a non-rotating drum of a clothes washing machine, where a plurality of transducers are distributed along an inside surface of the drum.

Referring now to FIG. 8, there is shown a drum 800 of a clothes washing machine having an open top 802 and a closed bottom 804. The drum 800 can be rotating or non-rotating. A plurality of piezoelectric transducers 100, 200, 300, 400 are utilized to effect efficient cleaning of clothes. In FIG. 8, the drum 800 is non-rotating and has a plurality of transducers 100, 200, 300, 400 distributed along an inside surface of the drum 800 in a plurality of lines (supports) 806. The lines 806 can be any shape, including vertical lines extending from the bottom to the top. The transducers 100, 200, 300, 400 may be rectangular, spherical or preferably cylindrical. The number of the lines 806 can range from 6 to 12 and the number of transducers 100, 200, 300, 400 per line can range from 2 to 4.

Figure 9:
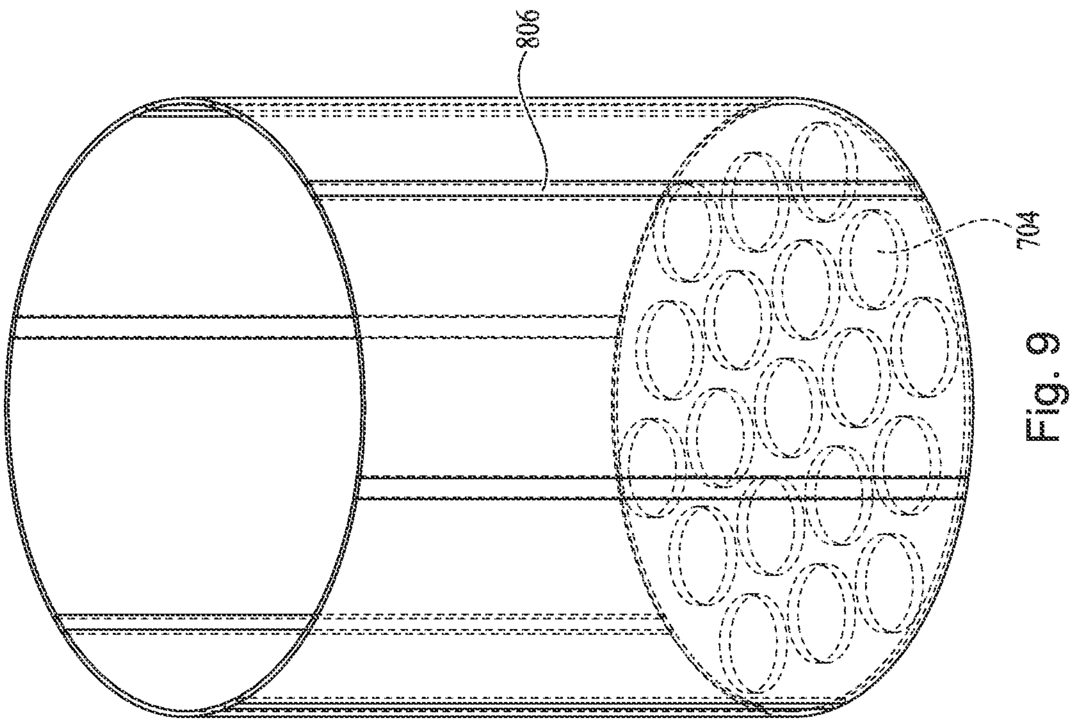
FIG. 9 is an additional perspective view of the drum of FIG. 8, where a bottom of the drum is equipped with a plurality of doughnut-shaped transducers.
Figure 10:
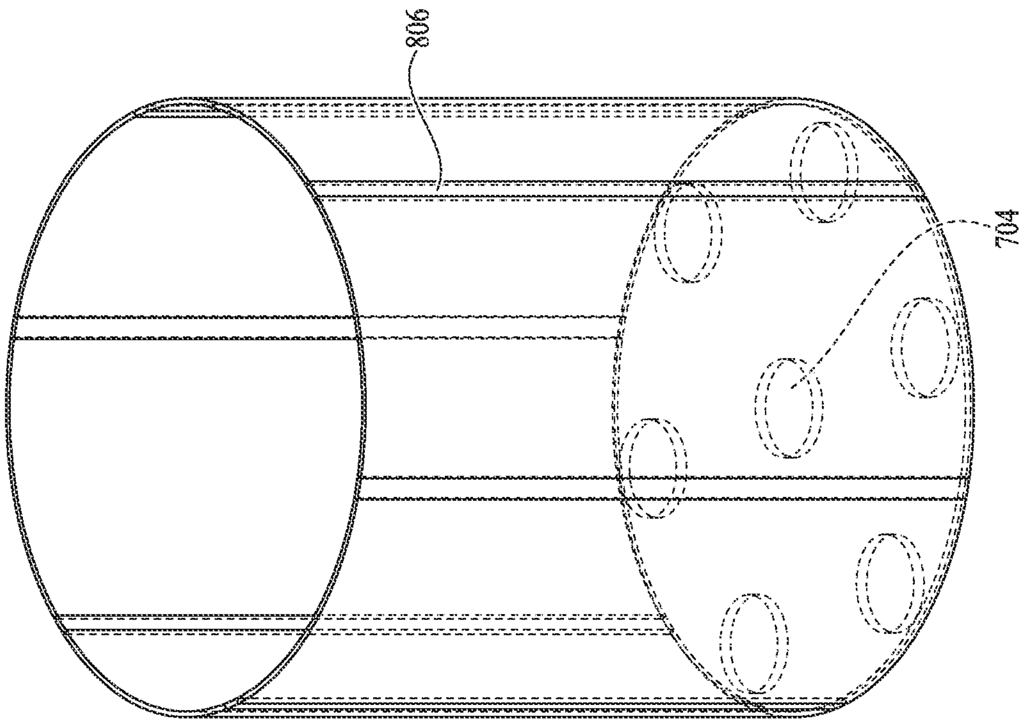
FIG. 10 is an additional perspective view of the drum of FIG. 8, where a bottom of the drum is equipped with a plurality of doughnut-shaped transducers.

Referring now to FIGS. 9 and 10, there is shown the non-rotating drum 800 of FIG. 8, where the bottom 804 of the drum is equipped with doughnut-shape flat transducers 704 whose number can range from 7 to 13.

Figure 11:
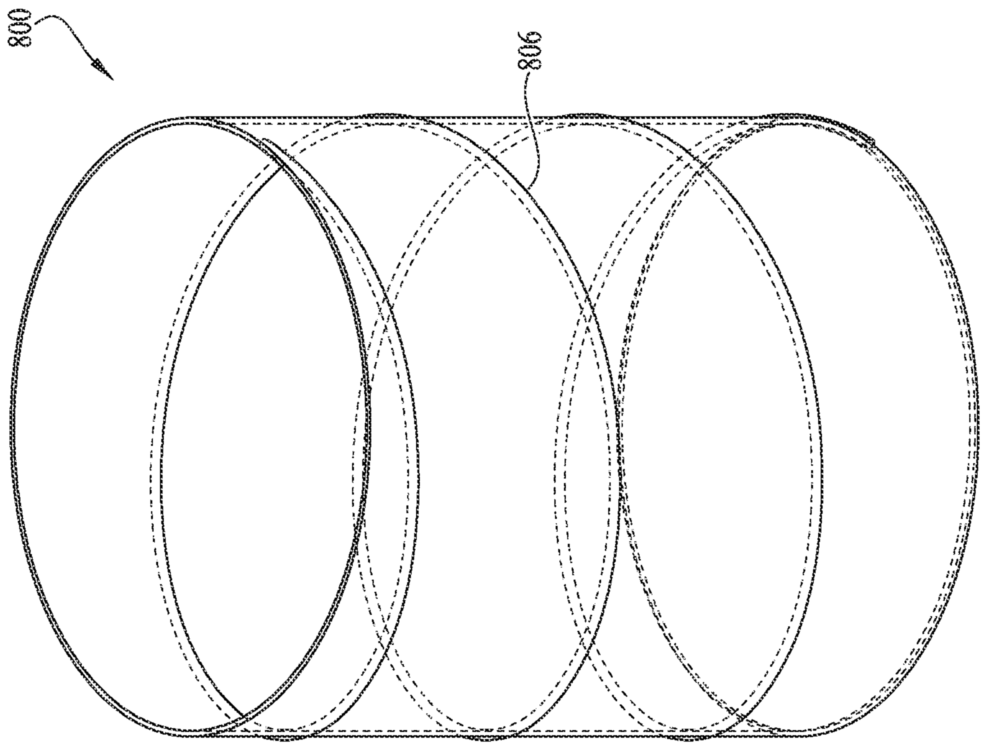
FIG. 11 is a perspective view of a non-rotating drum of a clothes washing machine, where a plurality of transducers are distributed along an inside surface of the drum in a helix configuration.

Referring now to FIG. 11, there is shown a non-rotating drum 800 with transducers 100, 200, 300, 400 distributed along an inside surface of the drum 800 in lines (supports) 806 in the shape of a helix. The number of the transducers 100, 200, 300, 400 can range from 12 to 48 and preferably the transducers are cylindrically focused.

Figure 13:
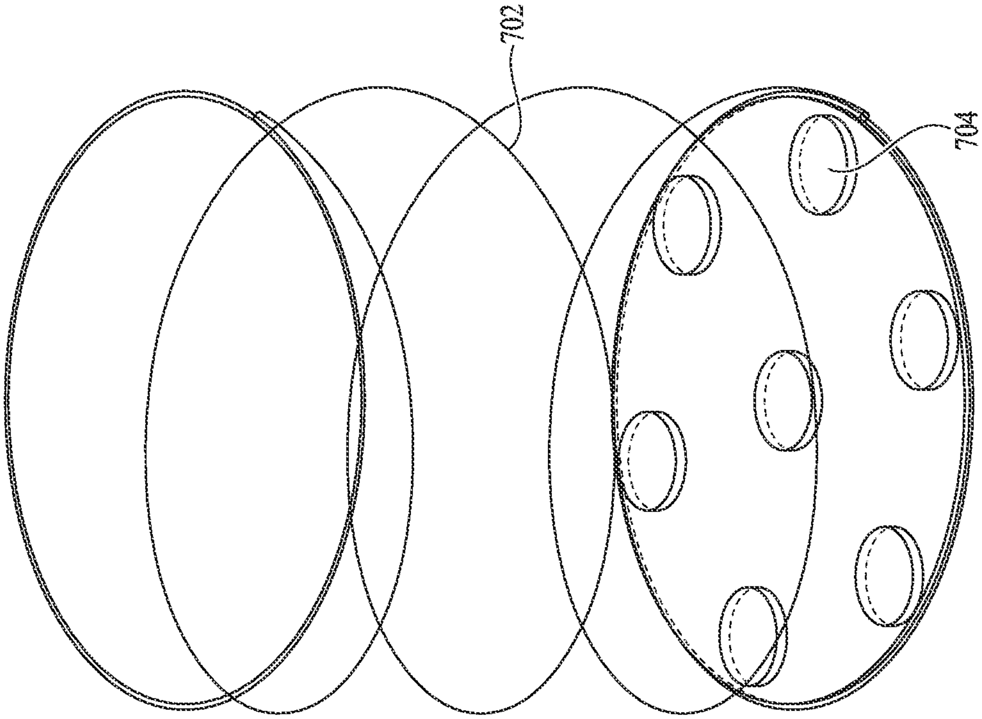
FIG. 13 is a schematic view of the drum of FIG. 12.
Figure 12:
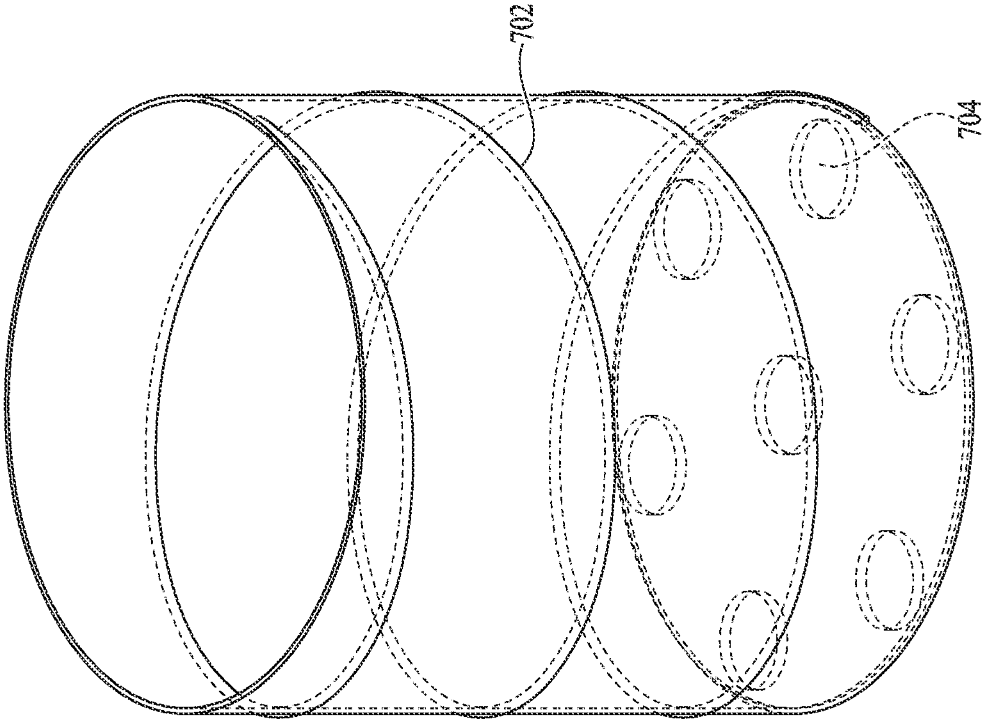
FIG. 12 is an additional perspective view of the drum of FIG. 11, where a bottom of the drum is equipped with a plurality of doughnut-shaped transducers.

FIG. 12 is the same configuration as in FIG. 11, except the bottom surface 804 of the drum 800 is equipped with doughnut-shape flat transducers 704 whose number can range from 7 to 13. FIG. 13 is a schematic of FIG. 12.

FIG. 14 shows one of the spherically-focused transducer with two water inlets and a bleeder to prevent air from being trapped.

Figure 15:
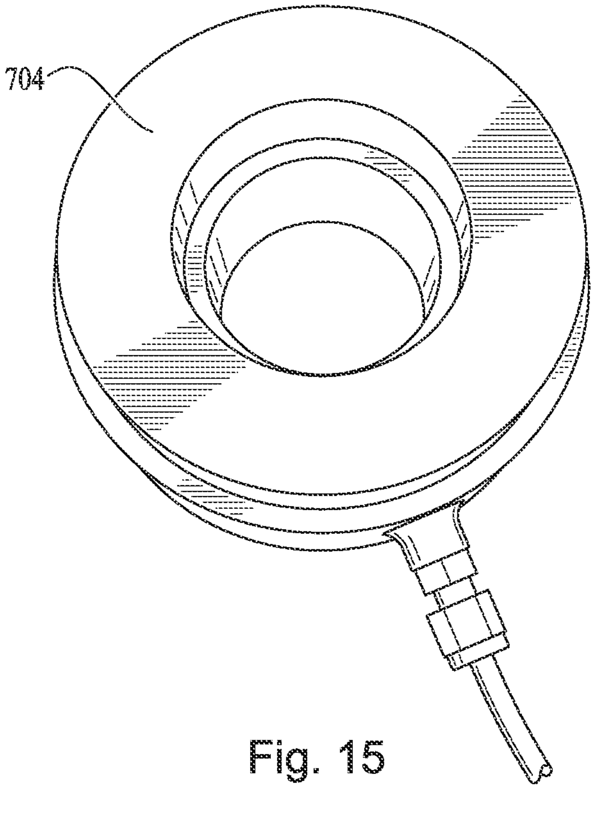
FIG. 15 is a top perspective view of a doughnut-shaped transducer.

FIG. 15 shows one of the doughnut-shaped transducers 704.

FIG. 16 shows one of the lenses 114 of the spherically-focused transducer.

Figure 17:
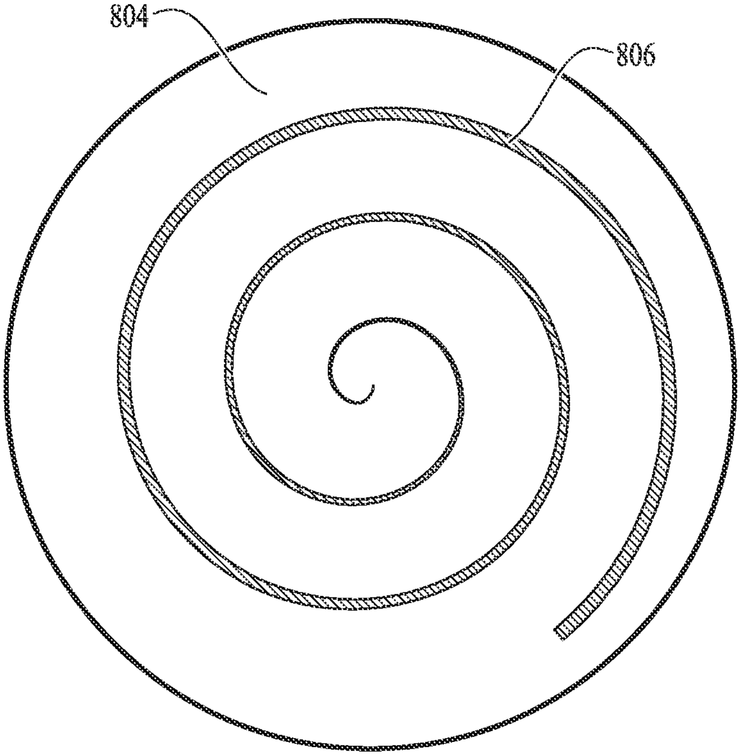
FIG. 17 is top plan view of an additional configuration of the transducers at the bottom of the drum of either FIG. 9, 10, or 12, where the transducers are cylindrically focused and distributed in a spiral configuration.

FIG. 17 is another possible configuration of the transducers 100, 200, 300, 400 at the bottom 804 of the drum 800. These transducers 100, 200, 300, 400 are smaller than the flat doughnut-shape transducers 704 referred to above and can be cylindrically or spherically focused and distributed in a line 806 in form of a spiral.

Figure 18:
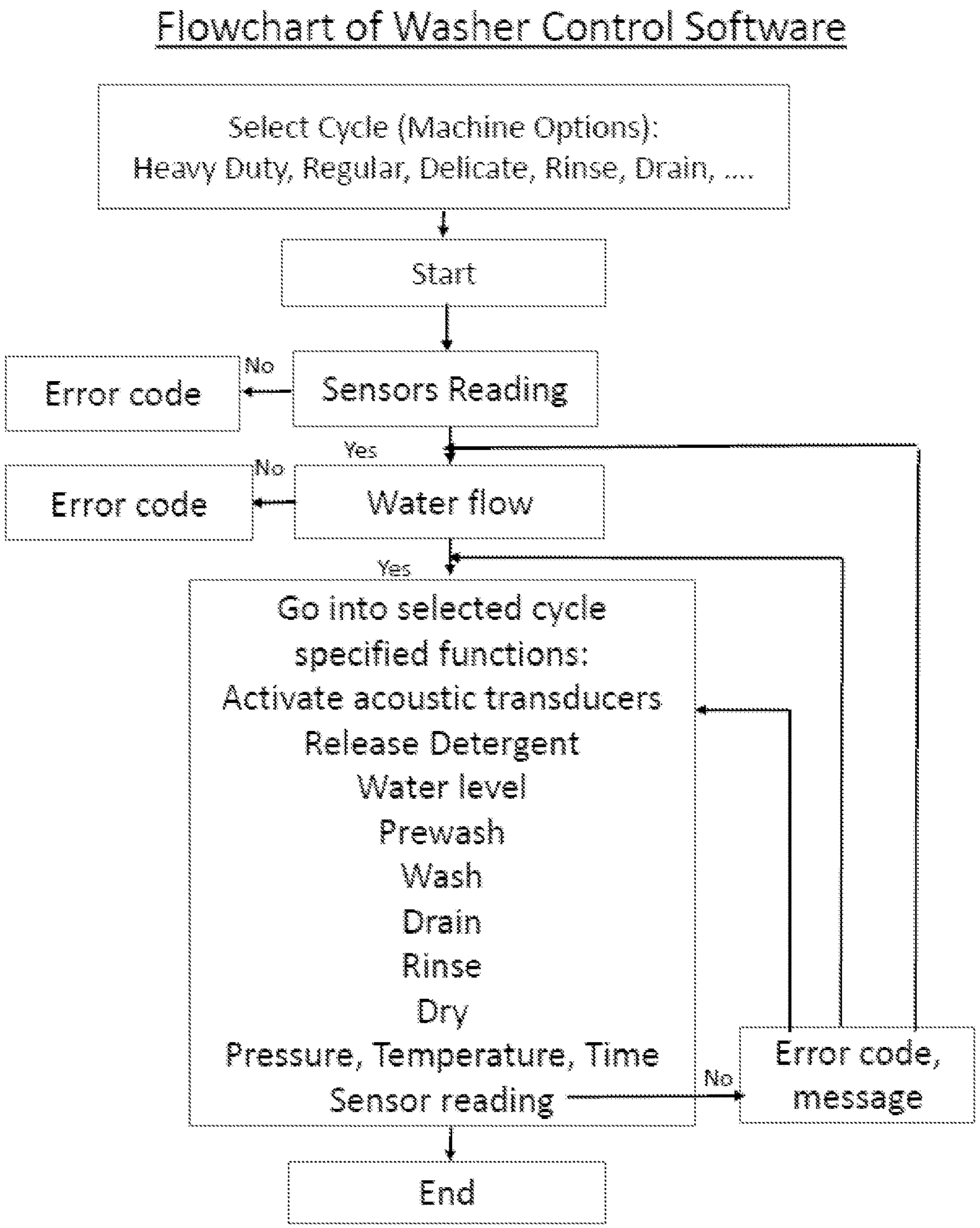
FIG. 18 is a flow chart of the software control for a clothes washing machine having features of the present invention.

FIG. 18 is a flow chart of the software control for a clothes washer 700 having features of the present invention.

As shown above, various configurations of support structure are possible, such as helical or spiral, depending on the application.

What is claimed is:

1. A system comprising:

a) at least one support, wherein the support comprises two rotating arms rotatably coupled to an interior bottom surface of a machine; and b) a plurality of piezoelectric transducers on each arm, each piezoelectric transducer comprising:

i) a cylindrical housing having a cylindrical side surface, a closed bottom surface and a conical or pyramidal top surface with a water outlet centered along the top surface of the housing;

ii) a water inlet along the side surface of the housing;

iii) a lens;

iv) piezoelectric material having an upper surface and a lower surface, the upper surface of the piezoelectric material coupled to the lens; and v) two electrodes electrically coupled to the lower surface and to the upper surface of the piezoelectric material and configured to couple to a power supply.

2. The system of claim 1, wherein the support is part of the machine, wherein the machine is a dishwashing machine.

3. The system of claim 2, wherein the machine is a clothes washing machine which comprises a non-rotatable drum and the drum is the support.

4. The system of claim 3, wherein the transducers comprise a plurality of doughnut-shaped transducers coupled to an interior bottom surface of the drum.

5. The system of claim 4, wherein the doughnut-shaped transducers are spaced around a perimeter of the interior bottom surface of the drum.

6. The system of claim 1, wherein at least one arm is slidable and is slidably coupled to the interior surface of the machine.

7. The system of claim 1, wherein the support is helix shaped.

8. The system of claim 1, wherein the support is spiral shaped.

9. The system of claim 1, wherein the piezoelectric material is lead zirconate titanate.

10. The system of claim 1, wherein the machine is a clothes washing machine and the support is part of the machine.

11. A system comprising:

a) at least one support, wherein the support comprises two rotating arms rotatably coupled to an interior bottom surface of a machine; and b) a plurality of piezoelectric transducers on each arm, each piezoelectric transducer comprising:

i. a body having a cylindrical side surface, a closed bottom surface and a top surface with a water outlet centered along the top surface of the body;

ii. a water inlet along the side surface of the body:

iii. a lens:

iv. piezoelectric material having an upper surface and a lower surface, the upper surface of the piezoelectric material coupled to the lens; and v. two electrodes electrically coupled to the lower surface and to the upper surface of the piezoelectric material and configured to couple to a power supply.

12. The system of claim 11, wherein the support is part of a machine which is a dishwashing machine or a clothes washing machine.

13. The system of claim 12, wherein at least one arm is slidable and is slidably coupled to the interior surface of the machine.

14. The system of claim 11, wherein the support is helix shaped.

15. The system of claim 11, wherein the support is spiral shaped.

16. The system of claim 15, wherein the machine is a clothes washing machine that comprises a non-rotatable drum and the support is coupled to an interior surface of the drum.

17. The system of claim 16, further comprising a plurality of doughnut-shaped transducers coupled to an interior bottom surface of the drum.

18. The system of claim 17, wherein the doughnut-shaped transducers are spaced around a perimeter of the interior bottom surface of the drum.

19. The system of claim 11, wherein the piezoelectric material is lead zirconate titanate.

* * * * *